I. HEINZ.
CRULLER SHAPING MACHINE.
APPLICATION FILED SEPT. 26, 1913.

1,099,040.

Patented June 2, 1914.
6 SHEETS—SHEET 6.

WITNESSES
G. Robert Thomas
B. Jaffe

INVENTOR
Ignatzius Heinz
BY
ATTORNEYS

UNITED STATES PATENT OFFICE.

IGNATZIUS HEINZ, OF NEW YORK, N. Y., ASSIGNOR OF ONE-HALF TO ROBERT LIEBSCHER, OF NEW YORK, N. Y.

CRULLER-SHAPING MACHINE.

1,099,040.  Specification of Letters Patent.  Patented June 2, 1914.

Application filed September 26, 1913. Serial No. 791,974.

*To all whom it may concern:*

Be it known that I, IGNATZIUS HEINZ, a subject of the Emperor of Austria-Hungary, and a resident of New York, borough of Manhattan, in the county and State of New York, have invented a new and Improved Cruller-Shaping Machine, of which the following is a full, clear, and exact description.

The object of the invention is to provide a machine which will automatically shape dough fed into the machine into a predetermined shape, as, for example, a cruller, and deliver the shaped dough; further, in shaping the dough by the machine, all waste of dough is eliminated.

I obtain the above object by providing a dough-fed mechanism having means for varying the quantity of dough fed to the machine, a receptacle adapted to receive the dough fed to the machine, means associated with the receptacle for shaping the dough therein into a predetermined form, and means adapted to receive the shaped dough from the receptacle.

The invention consists of the construction and combination of parts to be more fully described hereinafter and fully set forth in the claims.

Reference is to be had to the accompanying drawings forming a part of this specification, in which like characters indicate corresponding parts in all the views and in which:

Fig. 3 is a vertical, longitudinal section of the machine on line 3—3, Fig. 4.

Before proceeding to a more detailed description of my invention, it must be clearly understood that while this machine as disclosed is principally intended for shaping crullers, and reference is made to the same in the description of the machine, certain parts of the machine can be modified so as to form different shapes without departing in any way from the spirit of the invention.

Referring to the drawings, 11 represents a hopper of the feeding mechanism into which dough is placed which is to be fed to the machine. In the bottom of the hopper a pair of rollers 12 and 13 are provided, the axes of which are preferably in a horizontal plane, and the bearings for said rollers being provided in the frame 14. The bearings of the roller 12 are mounted adjustably in the frame and can be moved to and from the roller 13 by means of threaded members 15. By the adjustment of the roller 12 with reference to the roller 13, the thickness of dough from the hopper to the curved portion 16 of the trough 17 can be varied. The dough from the curved portion of the trough, before passing between the superposed rollers 18 and 19, is floured by means of a sifter 20 positioned in the frame, and in which is mounted to rotate a shaft 21 carrying a series of disks 22. These disks are for distributing the flour in the sifter, thereby preventing clogging of openings in the sifter by the flour.

The rollers 18 and 19 have, preferably, their axis in a vertical frame, of which the roller 19 has its bearings stationary in the plane, while the roller 18 positioned above the roller 19 has its bearings adjustably mounted in the frame, the bearings being carried by threaded members 23 positioned in the frame structure. The relative distance between the rollers 18 and 19 is smaller than the relative distance between the rollers 12 and 13, so that the dough advanced by the rollers 12 and 13 is kneaded to a smaller thickness by the rollers 18 and 19. A similar pair of rollers 18' and 19' is provided farther along in the trough, similarly mounted and adjustable by means of threaded members 22' for still more reducing the thickness of the dough. At the end of the trough 17 a roller 24 is mounted the bearings of which are adapted to be adjusted vertically by means of a threaded member 25 positioned in the structure of the frame 14. A roller 26, superposing the roller 24, has its bearing mounted adjustably in a horizontal plane by means of threaded members 27 secured to the frame structure 11. While the thickness of the dough fed between the rollers 24 and 26 is adjustable by means of the threaded member 25, the adjustment of the roller 26 by means of the threaded member 27 permits the variation of contact pressure between the said roller and the ribs 28 provided on the exterior, lateral surface of the drum 29 and forming the receptacles 30 on the same.

Figure 4:
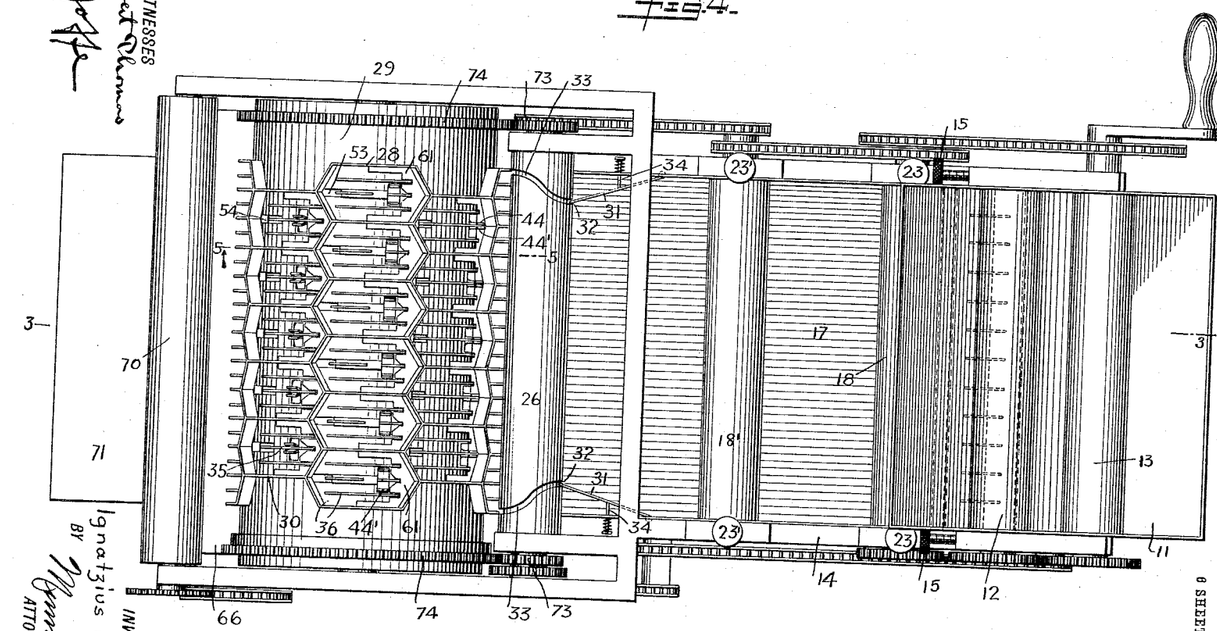
Fig. 4 is a plan view on the same.

The ribs 28, which are preferably integral with the lateral surface of the drum, form rows of receptacles each of elongated angular shape, preferably hexagonal. The longitudinal axis of each of the receptacles is substantially normal to the elements of the lateral surface of the drum. The successive rows of receptacles have a variable number of receptacles, while the alternate rows have the same number of receptacles. This structure makes the receptacles 30 staggered on the lateral surface of the drum. The upper edges of the ribs 28 contact with the roller 26 so that the dough fed by the rollers 24 and 26 is packed into the rows of receptacles as they pass the roller 26 when the drum 29 is rotated. As the successive rows of receptacles 30 on the lateral surface of the drum vary in number, the width of the dough fed to the successive row must be varied, so as to eliminate waste of dough. This is obtained by securing a wing 31 pivotally to each of the sides of the trough. The non-pivoted end of the wing 31, which is adjacent the roller 26, is provided with an extension 32 engaged in a cam groove 33 provided on the lateral surface of the roller. When the smaller number of receptacles in a row is to face the rollers 24 and 26, the wings 31 at each side of the trough are in position as shown in Fig. 4, thereby reducing the width of dough fed between the rollers 24 and 26 to the row of receptacles. Each of the wings 31 are preferably provided with a bolt 34 projecting through the sides of the trough and engaged on the exterior side by a coil spring so as to help to return the wing toward the side of the trough.

The lateral surface of the drum in each of the receptacles is provided with a central, longitudinal slit 35 lying substantially in the longitudinal axis of the receptacle. An additional slit 36 is also provided on each side of the slit 35 in each of the receptacles, the slits 36 being parallel to the slits 35 and of substantially the same length. Engaging the slits 35 and 36 in each of the receptacles are blades 37, and the blades engaging the slits of the same row of receptacles are all secured to a common rod 38 carrying at the end thereof rollers 39 each engaged in a cam groove 40 provided in the members 41 secured to a shaft 42 on which the drum 29 is mounted to rotate.

The cam groove 40 is so formed that the blades 37 mounted on the same rod 38 will project into the receptacles 30 of the same row before said receptacles come to face the rollers 24 and 26 (see Fig. 5), and remain in said receptacles of the same row until the said row passes entirely the roller 26, when it retracts again to its normal position. The cam groove 40 is so formed that the edge of the blade comes flush with the edge of the ribs 28, so that the edge of the blade also contacts with the roller 26 when the row of receptacles passes said roller, thereby the dough packed by said roller into a row of receptacles is slit by the blades in said receptacles into substantially four parts of equal width.

Each of the receptacles 30, adjacent one end of the central slit, is provided with a transverse slot 43 central with the same and through which projects into each receptacle one end of arms 44 and 44' of the spreader. The projecting ends of the arms located within each of the receptacles are disposed on opposite sides of the central blade. Each of the arms is pivotally attached by means of a pin 45 to the inner lateral surface of the drum. The end of each of the arms 44 and 44' lying within the drum is provided with an enlarged portion 46 in which a slot 47 is formed. The slot 47 of each of the arms 44 is engaged by a pin 48 positioned in a lug 49 integral with a rod 50. The slot 47 of the arm 44' is engaged by a pin 48' positioned in a lug 49' forming an integral part of a rod 50'. This structure connects all of the arms 44 of the same row of receptacles to a common rod 50, and the arms 44', the companions of the arms 44 of the same row of receptacles, to a common rod 50'. The ends of the rods 50 and 50' engage cam surfaces 51 and 51' respectively, both formed on circular members 52 rigidly secured to the stationary shaft 42. It is understood that each of the rows of receptacles is provided with rods 50 and 50'.

Figures 7, 8, 9:
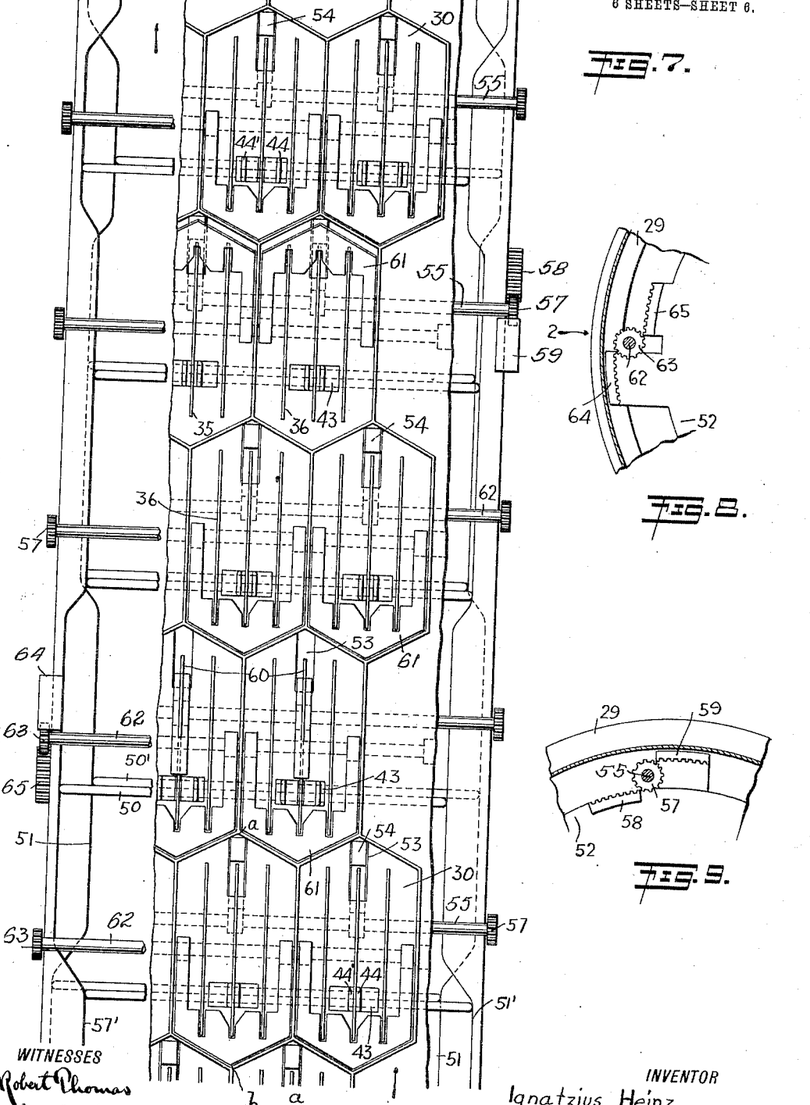
Fig. 7 is a partial development of the drum surface, showing the different positions of the mechanisms associated with the drum in the receptacles as the same moves from the feeding mechanism to the receiving mechanism.
Figs. 8 and 9 are detail, sectional views of the mechanism for operating the means for slinging the dough in the receptacle.

The arms 44 and 44' forming the spreader are actuated by the cam surfaces 51 and 51' twice during a single revolution of the drum. That is to say, the spreaders of each row are opened and closed twice during one revolution of the drum. The arms 44 and 44' forming the spreaders in the same row of receptacles are actuated by the cam surfaces at about the same moment that the blades 37 are retracted in the same row of receptacles; and since the blades are retracted at about 30 degrees from the line connecting the centers of the drum and the roller 26 (see Fig. 5), the arms 44 and 44' separate at about the same angle, thus spreading the central slit in the dough adjacent one end of the receptacle. (See Fig. 7, second row of receptacles from the bottom).

Each of the receptacles 30 is provided with a longitudinal slot 53 formed in the lateral surface of the drum and positioned in the opposite end of the receptacle from where the slit 43 is formed. The slit 53 is in alinement with and partly engaged by the blade 37 engaging the central slit 35. A finger 54 is provided for each of the receptacles; and it engages with one of its ends the slot 53, the opposite end of each of the fingers of the same row of receptacles being rigidly secured to a rod 55 positioned within the lateral surface of the drum and extending parallel to its element; thus each row of receptacles is provided with an independent rod 55. Each of the rods 55 is mounted to rotate in bearings 56 provided on the inner, lateral surface of the drum. A pinion 57 is provided at one end of each of the rods 55 and is adapted to come in engagement with racks 58 and 59. The racks 58 and 59 are preferably made integral with one of the members 52 which is secured to the stationary shaft 42. The engagement of each of the pinions 57 with the rack 58 will move the fingers 54 from their normal position to the position shown in the row of receptacles at 90 degrees to the horizontal. (See Fig. 5.) This movement of the fingers will cause the end of the dough positioned in each of the receptacles of said row to be slung toward the opposite end of the receptacles; and the fingers are so made that the end of the dough will be brought into the spread formed by the spreading action of the arms 44 and 44'. The further movement of the drum causes the engagement of the pinion 57 with the rack 59, thus bringing back the fingers 54 on the rod 55, the pinion of which engages the rack 59, to their normal position, in which they remain until they again come in engagement with the racks 58 and 59.

The racks 58 and 59 are so positioned on the members 52 that a pinion 57 comes in engagement with the rack 58 just as the arms 44 and 44' spread the slit in the dough. It is understood that the reference to the fingers 54 and arms 44 and 44' is made with regard to the same row of receptacles. As the fingers 54 are central with each of the blades 37 engaged in the central slit 35, they are provided with a slot 60 permitting the movement of the fingers without interference with the said blade.

Figure 5:
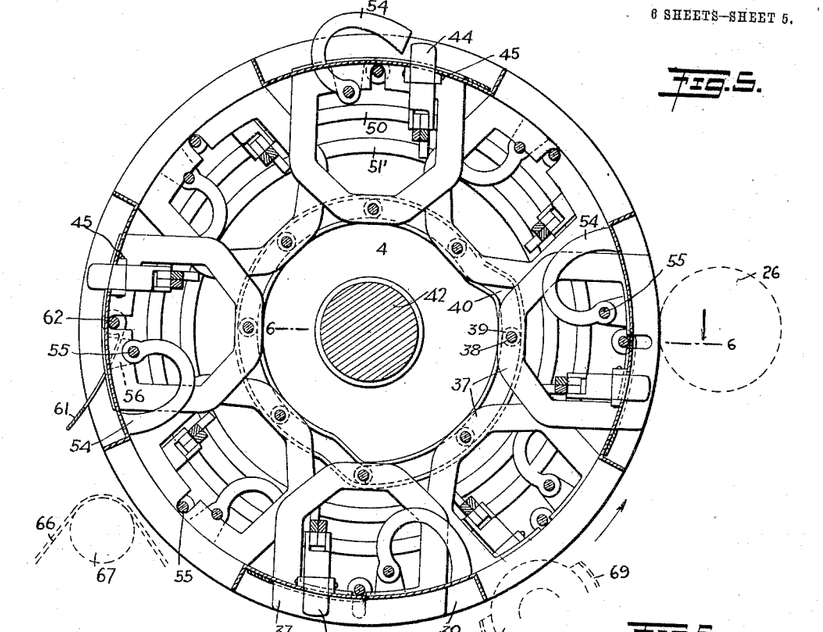
Fig. 5 is an enlarged, transverse section of the drum and the mechanism associated therewith on line 5—5 Fig. 4.
Figure 6:
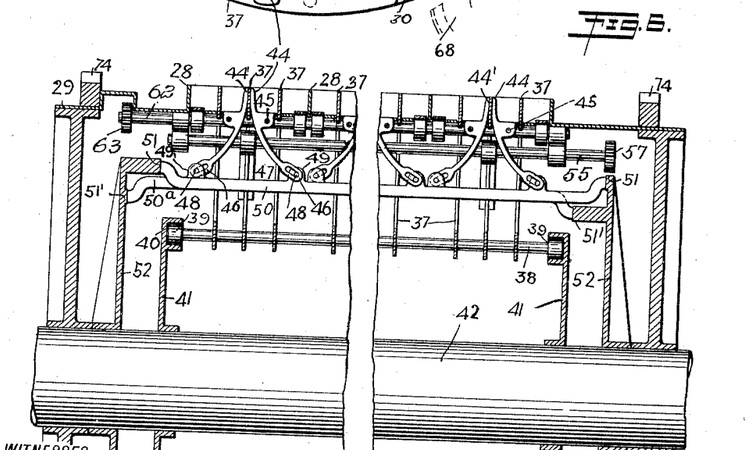
Fig. 6 is an enlarged fractional, longitudinal section of the drum, with the mechanism associated therewith, on line 6—6, Fig. 5.

From the above it will appear that each of the rods 55 is operable once during the revolution of the drum, the action taking place within an angle of about 60 degrees, the central line of which is about 90 degrees to the horizontal, as shown in Fig. 5. As the fingers 54 of the same row are returned to normal position, the arms 44 and 44' of the same rows come also to the normal position (see third row of receptacles from the bottom of Fig. 7) thereby pinching between the ends of the arms positioned in the spread of the dough the end of dough slung by the fingers 54 into the spread. This movement of the arms 44 and 44' is produced by the cam surfaces 51 and 51', the return to normal position of the arms 44 and 44' being accomplished at about 120 degrees from the line connecting the center of the drum to the roller 26.

Each of the receptacles 30 is provided with a member or pallet 61 normally resting against the lateral surface of the drum adjacent the end of the receptacle where the transverse slot 43 is provided. The pallet is preferably U-shaped, provided with slits to prevent interference with the blades 37, and the ends of the branches of the U being provided with lugs projecting through the lateral surface of the drum. The pallets positioned in the same row of receptacles have their lugs secured to a rod 62 mounted to journal in bearings provided at the inner lateral surface of the drum. A pinion 63 is provided on one end of each of the rods 62. Racks 64 and 65 are provided on the other member 52 similar to the racks 58 and 59, and with which the pinions 63 are adapted to come in engagemnt when the drum 29 is rotated. The engagement of one of the pinions 57 with the rack 64 causes the corresponding rod 62 to rotate and therewith the pallets mounted on said rod are moved from the normal position, as shown in Fig. 5, to the position shown in same figure in the receptacle positioned on the horizontal line on the opposite side of the roller 26. This movement of the pallets will sling the end of the dough resting on the same toward the opposite end of the receptacles. The further movement of the drum will bring the pallet 61 to normal position. From the above it will appear that the pallets of each of the rows are operable only once during a revolution of the drum.

As the pallet 61 of a row returns to the normal position, the arms 44 and 44' of the same row are again operated by the cam surfaces 51 and 51', thus releasing the end of the dough engaged by said arms. This second action of the arms takes place at an angle of about 200 degrees to the line connecting the centers of the drum to the roller 26. The dough in the row of receptacles which is at an angle of over 200 degrees to the line connecting the center of the drum with the center of the roller, not being any longer retained in the receptacle by any means for manipulating, will be free to fall out of the same on to an endless belt 66 engaged by rollers 67, the axes of which form the vertices of a triangle, the arms 44 and 44' coming again to their normal position at an angle of 270 degrees with reference to the line joining the centers of the drum to the roller 26. At the same point, the blades of the same row of receptacles are moved into the receptacles.

The rows of receptacles, after delivering the shaped dough to the belt 66, and before receiving a fresh load of dough, are floured by means of a rotating brush 68 positioned in a flour-carrying receptacle 69, the rotating brush throwing flour from the receptacle 69 on to the rows of receptacles passing the brush.

The shaped dough delivered on to the belt 66 is forced to pass between the belt and the roller 70 mounted to rotate, and from where the shaped dough falls on a removable bed 71 mounted between rollers 72 provided in the frame 14.

Figure 1:
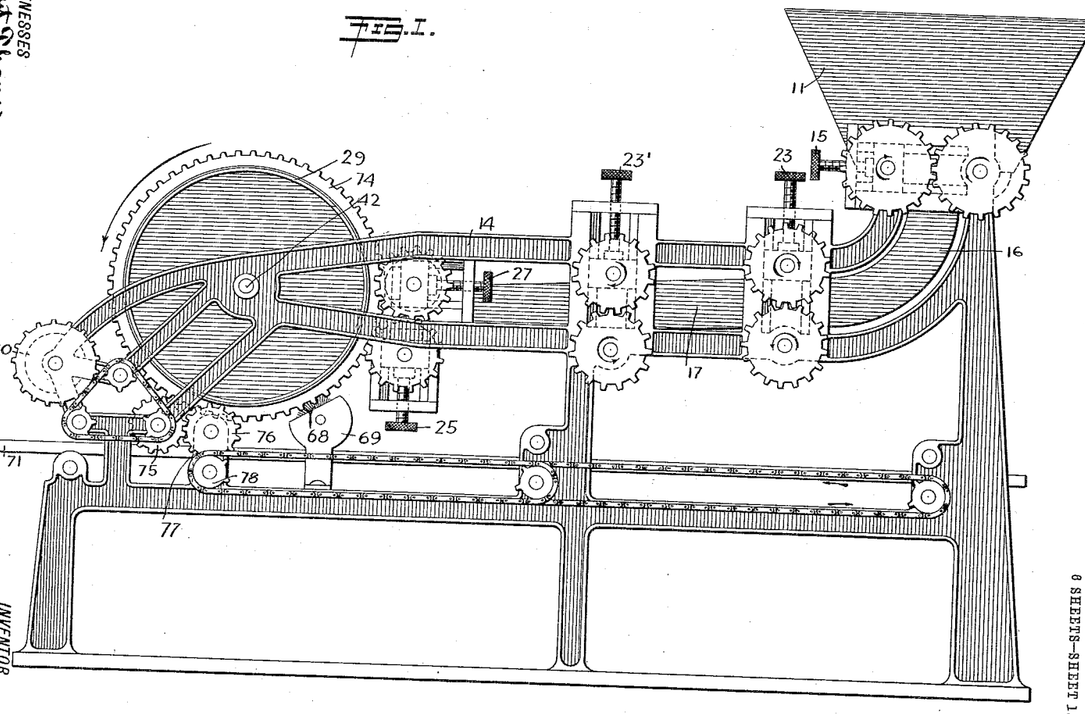
Figure 1 is a side elevation of a machine embodying my invention.
Figure 2:
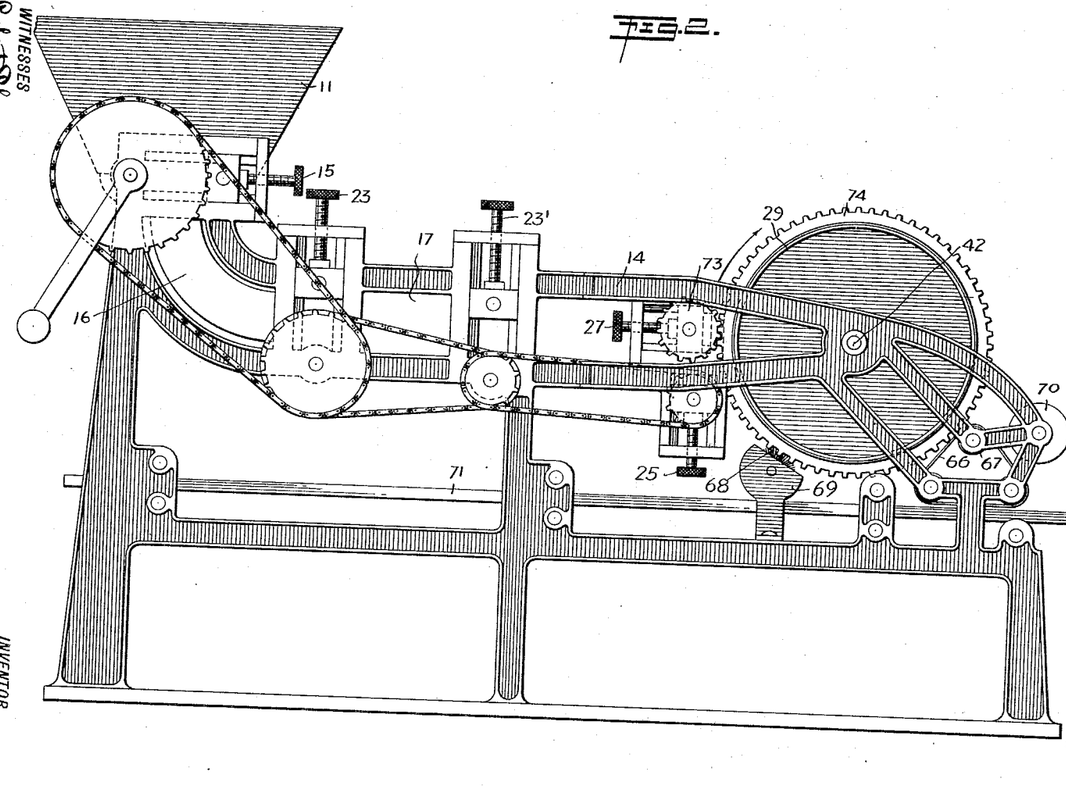
Fig. 2 is a similar elevation from the opposite side.

The rollers positioned in the trough, as well as the rollers 24 and 26, are all interconnected by means of endless chains engaging sprockets carried by the rollers, whereby when the roller 13, as shown in Figs. 2 and 4, is rotated by means of the crank all of the rollers are rotated through the medium of the chains. It is understood that in place of rotating the roller 13 by means of a crank, any other suitable motive power can be used. The roller 26 is provided with a pinion 73 which meshes with the gear 74 provided on the drum 29, whereby the drum 29 revolves on a stationary shaft 42 when the feeding rollers in the trough are revolved. Meshing with the gear 74 is a pinion 75 mounted on one of the rollers 67 engaging the endless belt 66. A second pinion 76 meshes with the pinion 75 and is mounted on one of the shafts carrying one of the rollers 72. In mesh with this pinion 76 is a pinion 77 positioned on the adjacent shaft of the adjacent roller 72. A sprocket 78 is positioned adjacent the pinion 77 and is connected by means of an endless chain to one of another pair of rollers 72, which roller is in turn connected by means of an endless chain to one of the following pairs of rollers 72; thus, all of the motion imparted to the roller 13 is transmitted by means of chains and pinions to the movable part. The relation of the parts is such that proper motion of the drum, belt and receiving table is obtained.

The operation of my machine is as follows: The dough received by the hopper 11 is drawn by the rollers 12 and 13 into the curved portion 16 of the trough, where it is floured by means of a sifter and then passes between the rollers 18 and 19, 18' and 19' provided in the trough. The dough is reduced in thickness during its motion and thereby kneaded. The rollers 24 and 26 positioned at the end of the trough pack the dough into the rows of receptacles, passing the same during the motion of the drum in the direction as indicated in the drawings. The rows of receptacles, previous to being packed with dough by the rollers 24 and 26, are floured by the brush 68, thus preventing the sticking of the dough in the receptacles. The blades 37 of the rows of receptacles are forced into the receptacles previous to their being packed with dough by the rollers 24 and 26, so that when the dough is packed by the rollers it is simultaneously divided in the receptacles, as previously stated, into substantially four equal branches. The ends of the arms 44 and 44' forming the spreaders are in normal position against the blades engaging the central slit 35 when the same are packed by the rollers. Frictional engagement of the edges of the ribs 28 forming the receptacles, and also of the blades 37, (as they are flush with the edges as previously stated,) with the roller 26 eliminates any surplus dough above the edges of the ribs and the blades. Following out one of the rows of receptacles as it is packed by the rollers 24 and 26 until the same row delivers its shaped dough to the endless belt 66, we find that as soon as the receptacle positioned in Fig. 5 on the horizontal line directed toward the roller 26 from the center of the drum has moved through an angle of 30 degrees, the blades 37 in said row of receptacles retract. Simultaneously with the retraction of the blades at this point, the arms 44 and 44' are moved on their pivots 45 in the same row of receptacles, spreading the central slit at one end transversely. At an angle of about 90 degrees to the mentioned horizontal line, the end of the arms projecting into the receptacle are spread to their maximum. At this point of maximum spreading of the arms in the row of receptacles, the fingers 54 of the same row are moved by the racks 58 into the position shown when the said row of receptacles have reached the position occupied by the receptacles at 90 degrees to the horizontal line directed from the center of the drum toward the roller 26. (See Fig. 5.) This movement of the fingers throws the ends of the dough toward the opposite end of the receptacle and into the spreads formed by the arms 44 and 44'. As the drum continues its motion, the fingers 54 are brought to their normal position by the engagement of the pinion 57 with the rack 59. Simultaneously during the motion of the drum in the direction indicated in Fig. 5, the arms 44 and 44' in the same rows of receptacles are brought to their normal position, thus clamping between them the end of the dough slung by the fingers 54 into the spreads. The return to normal position of arms 44 and 44' is accomplished when the row of receptacles has moved through about an angle of 120 degrees to the horizontal directed from the center of the drum toward the roller 26.

Figures 9, 10:
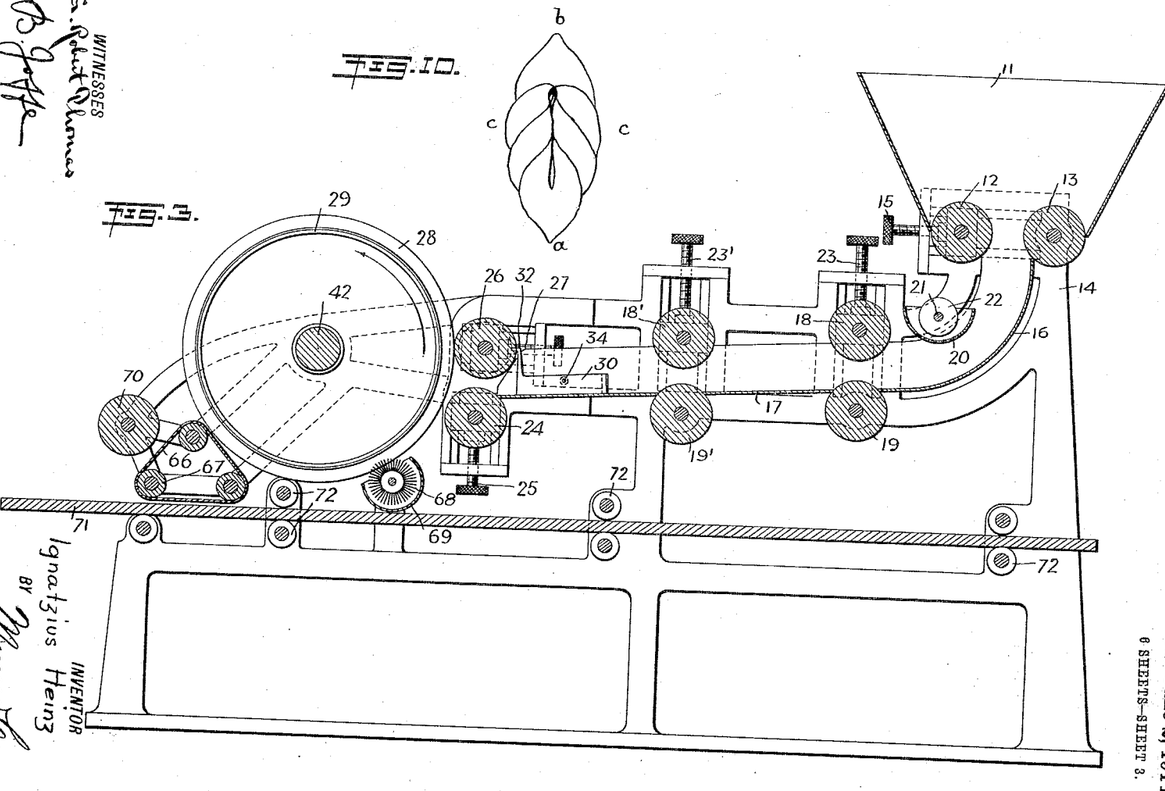
Fig. 10 shows a shaped piece of dough as delivered from a receptacle.

In Fig. 10 the point *a* represents the end of the dough in the receptacle which is slung by the finger 54 into the spread and there engaged by the arms 44 and 44'. As the drum continues to rotate, the pinion 63, positioned on the shaft 62 controlling the pallets of the row of receptacles under consideration, engages the rack 64 and revolves the shaft, thereby moving the pallets from their normal position. The normal position of the pallets is the contact of the same with the lateral surface of the drum; and when they are moved through the engagement of the pinion 63 with the rack 64 they move from their normal position to the position shown when the row of receptacles under consideration has moved through an angle of 180 degrees with reference to the horizontal line directed from the center of the drum toward the roller 26. This movement of the pallets will throw the end of the dough carried by the pallet in each of the receptacles toward the opposite end of the receptacles, this end of the dough being marked in Fig. 10 as *b*, and being slung toward the end of the receptacle where *a* was positioned originally. During the movement of the pallets in the row of receptacles under consideration, the end *a* of the dough is still retained by the ends of the arms 44 and 44', thus the movement of the pallets cannot throw the dough out of the receptacles.

The action of the pallets from normal to normal takes place within an agle of about 30 degrees, the central line of which is 180 degrees to the horizontal direct from the center of the drum toward the roller 26. At this central line it is at the limit of its movement, and is so shown in Fig. 5. As the drum continues to rotate, the pallets under consideration having returned to their normal position, the arms 44 and 44' in the receptacles of the row under consideration begin to open and disengage the end *a* of the dough, the disengagement taking place at an angle of 200 degrees to the said horizontal line, and the rows of receptacles under consideration begin to pass the upper roller 67 engaged by the endless belt 66. Attention is called to the fact that when the end *b* of the dough in each of the receptacles is slung to the position shown in Fig. 10 by the pallet, it leaves the exterior sides of the ends of the arms 44 and 44' in the receptacles free. As the same are open, the shaped dough, as shown in Fig. 10, is no longer retained in said receptacles, and, due to the position of said receptacles, the shaped dough in each of the receptacles under the action of gravity will drop on to the belt 66 and move to pass between the roller 70 and the belt 66, whereby it is slightly flattened out. After passing between the rollers 70 and the belt 66 the shaped dough will drop on to the moving bed 71. When the bed 71 is completely loaded with rows of shaped dough, the same may be transferred to the baking room.

The provision of the slits 36 gives to the shaped dough the additional ribs *c*, which give a larger appearance to the cruller. It is understood that in reality the only slit necessary is the central slit 35; and the number of slits 36 may be increased, if desired, as they only add to the exterior appearance of the cruller.

The elimination of waste of dough fed to the rows having a different number of receptacles is obtained by means of the wings 31 secured to the sides of the trough and engaged by the grooves 33 in the rollers 26, as has been previously explained.

Having thus described my invention, I claim as new and desire to secure by Letters Patent:

1. In a cruller making machine,—a dough feed mechanism; a receptacle adapted to receive the dough fed by the mechanism; and means associated with the receptacle to cut and sling the dough into the shape of a cruller.

2. In a cruller making machine,—a dough feed mechanism; a receptacle adapted to receive the dough fed by the mechanism; cutting and slinging means associated with the receptacle to shape the dough into a cruller; and means for inverting the receptacle to deliver the shaped cruller.

3. In a cruller making machine,—a dough feed mechanism; a receptacle adapted to receive the dough fed by the mechanism; means for slitting the dough in the receptacle; and means for arranging the slit portions of the dough into a predetermined shape.

4. In a cruller making machine,—a dough feed mechanism; a receptacle to receive the dough fed by the mechanism; means for slitting the dough in the receptacle; means for bringing one end of the dough in the receptacle into the slit, thereby shaping the dough into a cruller; and means for moving the receptacle so as to deliver the shaped cruller.

5. In a cruller making machine,—a mechanism for feeding dough; a receptacle adapted to receive the dough fed by the mechanism; means for slitting the dough in the receptacle; means for drawing one end of the dough through the slit; and means for slinging the opposite end of the dough to the opposite end of the receptacle, thereby shaping the dough in the receptacle into a cruller.

6. In a cruller making machine,—a mechanism for feeding dough; a receptacle adapted to receive the dough fed by the mechanism; means for slitting the dough in the receptacle; means for spreading the slit;

means for engaging one end of the dough in the receptacle into the spread slit; means for bringing the opposite end of the dough to the opposite end of the receptacle, thereby shaping the dough in the receptacle into a cruller; and means for moving the receptacle so as to deliver the cruller.

7. In a cruller making machine,—a mechanism for feeding dough; a receptacle adapted to receive the dough fed by the mechanism; means for slitting the dough in the receptacle; means for spreading the slit; means for bringing one end of said dough in the receptacle to the spread slit, said means for spreading the slit being adapted to engage said end of dough and retain it in the slit; and means for bringing the opposite end of the dough to the opposite end of the receptacle, thereby shaping the dough in the receptacle into a cruller.

8. In a cruller shaping machine, a dough feeding mechanism; a receptacle adapted to receive the dough fed by the mechanism; means for slitting the dough; and means for slinging the slit dough into predetermined shape.

9. In a cruller making machine,—a mechanism for feeding dough; a receptacle adapted to receive the dough fed by the mechanism; means for slitting the dough in the receptacle; means for spreading the slit adjacent one end of the dough in the receptacle; means for slinging the opposite end of the dough into the spread portion of the slit, said means for spreading the slit in the dough adapted to engage said end of dough and retain it therein; and means for slinging the opposite end of the dough to the opposite end of the receptacle, thereby shaping the dough in the receptacle into a cruller.

10. In a cruller making machine,—a mechanism for feeding dough; a receptacle adapted to receive the dough fed by the mechanism; means for moving the receptacle; means for slitting the dough longitudinally in the receptacle; means for spreading the slit at one end; means for slinging the end of the dough adjacent the non-spread end of the slit into the spread portion of said slit, said means for spreading the slit being adapted to engage and retain said end in the slit; means for slinging the other end of the dough in the receptacle to the opposite end of the receptacle; means adapted to disengage the end of the dough in the slit from the means for spreading the slit whereby the dough from the receptacle shaped into a cruller can be delivered when the receptacle takes a predetermined position during its motion.

11. In a cruller making machine,—a mechanism for feeding dough; a movable receptacle adapted to receive the dough fed by the mechanism; means for slitting the dough in the receptacle longitudinally; means for spreading the slit; means for slinging one end of the dough into the spread slit, said means for spreading the slit adapted to retain said end of the dough in the slit; and means for slinging the other end of the dough toward the opposite end of the receptacle, all of said means being movable with the receptacle and operable during its movement.

12. In a cruller making machine,—a mechanism for feeding dough; a drum having a plurality of ribs on the periphery thereof forming receptacles of substantially hexagonal shape; means for rotating the drum whereby the said receptacles are brought to the feed mechanism to receive the dough, each of said receptacles having means for slitting the dough in the receptacle longitudinally, means for spreading the slit, means for slinging one end of the dough into the spread slit, means for slinging the other end of the dough toward the opposite end of the receptacle, all of the said means for every receptacle being carried by the drum and operated during its motion; and means for receiving the dough from the receptacle when the same is in a predetermined position.

13. In a cruller making machine,—a mechanism for feeding dough; a drum having ribs on the lateral surface thereof forming longitudinal receptacles of substantially polygonal form; means for rotating the drum whereby the receptacles are adapted to receive the dough from the feeding mechanism, each of said receptacles having means for slitting the dough longitudinally; means for spreading the slit; means for slinging one end of the dough into the spread slit, said means for spreading the slit adapted to retain said end of the dough in the slit; means for slinging the other end of the dough toward the opposite end of the receptacle, all of the means for each of the receptacles being carried by the drum and operable during its motion, said spreading means retaining the dough in the slit adapted to release the said end of the dough thereby permitting the delivery of the cruller formed in the receptacle; and means for receiving the formed cruller.

14. In a cruller making machine,—a drum having rows of receptacles on the lateral surface thereof, the alternate rows having the same number of receptacles; means for rotating the drum; means for feeding dough to the rows of receptacles; and means associated with the feeding means to adjust the flow for the alternate rows.

15. In a cruller making machine,—a drum having rows of receptacles on the lateral surface thereof, the numbers of receptacles in adjacent rows varying, with the alternate rows having the same number of receptacles; means for rotating the drum; means for feeding dough to the rows of receptacles; means for varying the feed for different rows, (thereby eliminating waste of dough) each of said receptacles on the drum having means to shape the dough therein into a cruller during the movement of the drum; and means adapted to receive the shaped cruller.

16. In a cruller making machine,—a drum having rows of receptacles on the lateral surface thereof, the successive rows varying in the number of receptacles, with the alternate rows having the same number of receptacles; means for rotating the drum; a pair of rollers adjacent the lateral surface of the drum; a trough associated with said rollers and adapted to convey dough to said rollers; means for revolving said rollers whereby the dough from the trough is fed into the rows of receptacles when the drum is rotated; means associated with the sides of the trough and the rollers whereby the width of the dough fed to the row of receptacles is varied in accordance with the row receiving the dough, each of said receptacles having means to shape the dough in the receptacle into a cruller; and means adapted to receive the shaped cruller from the receptacle.

17. In a cruller making machine,—a drum having rows of receptacles on the exterior lateral surface thereof, the successive rows varying in the number of receptacles, while the alternate rows have the same number of receptacles; a pair of superposed rollers adjacent the exterior lateral surface of the drum; a trough associated with said superposed rollers and adapted to convey dough to the same; means for revolving the superposed rollers and the drum whereby the dough from the trough is fed into the rows of receptacles; grooves in the upper roller and wings secured to the side of the trough and engaged by said grooves whereby the width of dough fed to the rows of receptacles is varied in accordance with the number of receptacles in the row facing the rollers, each of said receptacles having means for shaping the dough therein into a cruller; and means adapted to receive the shaped cruller.

18. In a cruller making machine,—a drum having rows of receptacles on the lateral surface thereof, the number of the receptacles in the successive rows varying in number with the alternate rows having an equal number of receptacles; a pair of superposed rollers adjacent the lateral surface of the drum; a trough adapted to convey dough between said rollers; means for revolving the rollers and the drum whereby the dough from the trough is delivered to the rows of receptacles on the drum; means associated with the trough and controlled by one of the rollers whereby the width of the dough fed to the receptacles is varied according to the row facing the said rollers, each of said receptacles being substantially of elongated hexagonal shape and having means to shape the dough into the receptacle into a cruller during the movement of the drum; and means adapted to receive the shaped cruller.

19. In a cruller making machine,—a drum having rows of receptacles on the exterior lateral surface thereof; means for feeding dough to said rows of receptacles; means for flouring the receptacles of the rows before the dough is fed into the same, each of said receptacles having means to shape the dough in the same into a cruller; and means adapted to receive the shaped cruller from the receptacle.

20. In a cruller making machine,—a drum having rows of receptacles on the exterior lateral surface thereof; means for rotating the drum; means for feeding dough to the rows of receptacles during the rotation of the drum, each of the receptacles having three slits in the lateral surface of the drum; a blade in each of said slits; means for reciprocating the blades to and from the lateral surface of the drum in the receptacle whereby the dough fed into the receptacle is slit; means for spreading one of the slits in the dough of each receptacle; means for slinging one end of the dough of each receptacle into the spread slit, said means for spreading the dough adapted to engage and retain the said slung end in the slit; means in each of the receptacles for slinging the opposite end of the dough toward the opposite end of the receptacle; means causing the releasing of the end of the dough engaged by the spreading means; and means adapted to receive the dough from the receptacles shaped into a cruller by said means, which are all operable during the movement of the drum.

21. In a cruller making machine,—a drum having rows of receptacles on the exterior lateral surface thereof; means for rotating said drum; means for feeding dough to said rows of receptacles during the movement of the drum, each of said receptacles having means for slitting the dough in the receptacles, means for spreading the slit, means for slinging one end of the dough of the receptacle into the spread slit and means for throwing the opposite end of the receptacle, whereby the dough in the receptacle is shaped into a cruller, all of said means in each of the receptacles of the same row being operated simultaneously during the movement of the drum.

22. In a cruller making machine,—a drum having rows of receptacles on the exterior lateral surface thereof; means for feeding dough to the rows of receptacles; means for actuating the drum and the feeding means, each of the receptacles having a hexagonal elongated shape the longitudinal axis of which is substantially normal to the elements of the lateral surface of the drum, each of said receptacles having longitudinal slits in the lateral surface of the drum forming the bottom of the receptacles, one of said slits being central with the receptacle; a blade engaging said slits in each of the receptacles; means for moving said blade into and out of the receptacles, whereby the dough in the receptacles is slit; means in each of the receptacle for spreading the central slit of the dough; means in each of the receptacles for slinging the end of the dough in alinement with the central slit through the spread slit of the dough, said spreading means being adapted to retain the end of the dough in the spread; means in each of the receptacles for slinging the opposite end of the dough toward the opposite end of the receptacle, whereby the dough in each of the receptacles is shaped into a cruller, all of said means in each of the receptacles being operable during the movement of the drum; means for causing said spreading means to disengage the end of the dough; and means adapted to receive the crullers from the receptacles.

23. In a cruller making machine,—a drum having rows of receptacles on the lateral surface thereof; means for feeding dough to the rows of receptacles; means for actuating the drum and the feeding mechanism; means in each of the receptacles for shaping the dough into a predetermined form during the movement of the drum; an endless belt adapted to receive the shaped dough from the receptacles; a movable bed adapted to receive the dough from the belt; and a movable roller associated with the belt and adapted to flatten slightly the shaped dough previous to its delivery to the moving bed.

24. In a cruller making machine,—a drum having rows of receptacles on the exterior lateral surface thereof; means for feeding dough to the rows of receptacles; means for actuating the drum and the feeding means, each of the receptacles having an elongated shape the longitudinal axis of which is substantially normal to the elements of the lateral surface of the drum, each of said receptacles having longitudinal slits in the lateral surface of the drum forming the bottom of the receptacle, said slits being symmetrically disposed in said receptacles with one of the slits in each of the receptacles lying in alinement with the longitudinal axis of the same; a blade in each slit in each of the receptacles; means for moving said blades into and out of the receptacles whereby the dough in the receptacle is slit; means in each of the receptacles for spreading one end of the slit of the dough alining with the axis of the receptacle; means in each of the receptacles for slinging the end of the dough adjacent the non-spread end of the slit into said spread slit of the dough, said spreading means being adapted to retain the end of the dough in the spread; means in each of the receptacles for slinging the opposite end of the dough toward the opposite end of the receptacle thereby shaping the dough in each of the receptacles into a cruller, all of said means in each of the receptacles being carried by the drum and operated during its movement; means for causing said spreading means to disengage the end of the dough; and means adapted to receive the shaped dough from the receptacle after the same is disengaged by said spreading means.

25. In a cruller shaping machine, a dough feeding mechanism; receptacles adapted to receive the dough; adjustable means controlling the feed from the feed mechanism to the receptacles; and cutting and slinging means associated with the receptacles to arrange the dough into a predetermined shape.

26. In a cruller making machine,—a stationary shaft; a drum having rows of receptacles on the lateral surface thereof rotatably mounted on said shaft; means for feeding dough to the rows of receptacles; means for actuating the drum and the feeding means, each of the receptacles having slits in the lateral surface of the drum forming the bottom of the receptacle; a blade engaging each of the slits of each of the receptacles; a member carrying all of the blades of the same rows of receptacles; a cam mounted on said shaft and engaged by said members whereby said blades are made to move into and out of the receptacles of the same row when said drum is rotated on the shaft, whereby the dough in the receptacles is slit by said blades; means in each of the receptacles for spreading the central slit of the dough; means in each of the receptacles for slinging one end of the dough into the spread slit of the dough; means in each of the receptacles for slinging the other end of the dough toward the opposite end of the receptacle; and means adapted to receive the shaped dough from the receptacles.

27. In a cruller making machine,—a stationary shaft; a drum rotatably mounted on said shaft and having rows of receptacles on the exterior lateral surface thereof; means for feeding dough to the rows of receptacles; means for actuating the drum and the feeding means, each of the receptacles having slits in the lateral surface of the drum forming the bottom of the receptacles; a blade in each of the slits; means connecting all of the blades of the same row of receptacles positioned within the drum; cams rigidly secured to said shaft and engaged by said means securing the blades of the same row of receptacles together, said cams being so positioned to move the blades of the same row into the receptacle previous to the same being fed with dough and retracting the same after it is fed, thereby slitting the dough in each of the receptacles of the same row; means in each of the receptacles for spreading one slit of the dough; means in each of the receptacles for slinging one end of the dough into the spread slit of the dough; means in each of the receptacles for slinging the other end of the dough toward the opposite end of the receptacle; and means adapted to receive the shaped dough from the receptacles.

28. In a cruller making machine,—a drum having rows of receptacles on the exterior lateral surface thereof; means for feeding dough to the rows of receptacles; means for actuating the drum and the feeding mechanism; means in each of the receptacles for slitting the dough in the same, each of said receptacles having a spreader adapted to open the slit, means for actuating the spreader; means in each of the receptacles for slinging one end of the dough into the spread slit of the dough; means in each of the receptacles for slinging the other end of the dough toward the opposite end of the receptacle; and means adapted to receive the shaped dough from the receptacles.

29. In a cruller making machine,—a stationary shaft; a drum rotatably mounted on said shaft and having rows of receptacles on the exterior, lateral surface thereof; means for feeding dough to the rows of receptacles; means for rotating the drum and the feeding means, each of the receptacles having means for slitting the dough therein, each of the receptacles having a spreader, means for operating the spreaders twice during a complete revolution of the drum whereby the slit in the dough is first spread; means in each of the receptacles for slinging one end of the dough into the spread slit of the same, said spreader adapted to engage said slung end in returning to its normal position; means in each of the receptacles for slinging the other end of the dough toward the opposite end of the receptacle, said spreader adapted to release said slung end of the dough during the second operation of the spreader whereby the shaped dough in the receptacle is released from the spreader; and means adapted to receive the shaped dough from the receptacle, said spreader coming to its normal position before the receptacle receives another charge of dough.

30. In a cruller making machine,—a drum having a row of receptacles on the lateral surface thereof; a pair of rollers adjacent the lateral surface of the drum for feeding dough to the rows of receptacles; means for rotating the rollers and the drum; means for adjusting one of the rollers vertically and the other horizontally; means associated with each of the receptacles for shaping the dough therein into a predetermined form as the drum rotates; and means adapted to receive the shaped dough from the receptacles.

31. In a cruller making machine,—a drum having a row of receptacles on the lateral surface thereof; a pair of supported rollers adjacent the lateral surface of the drum for feeding dough to the rows of receptacles; means for rotating the rollers and the drum; means for adjusting the upper roller horizontally; means for adjusting the lower roller vertically; means associated with each of the receptacles for shaping the dough therein into a predetermined form, said means for shaping the dough in the receptacles being actuated during the rotation of the drum; and means adapted to receive the shaped dough from the receptacles.

32. In a cruller making machine,—a drum having rows of receptacles on the lateral surface thereof; means for feeding dough to the rows of receptacles; means for actuating the drum and the feeding means, each of the receptacles having means for slitting the dough therein; a pair of arms projecting into each of the receptacles and positioned on the opposite side of the means for slitting the dough; means for moving the arms to and from each other; means in each of the receptacles for slinging one end of the dough toward said arms; means in each of the receptacles for slinging the other end of the dough toward the opposite end of the receptacle; and means adapted to receive the shaped dough from the receptacles.

33. In a cruller making machine,—a drum having rows of receptacles on the lateral surface thereof; means for feeding dough to the rows of receptacles; means for actuating the drum and the feeding means, each of the receptacles having means for slitting the dough therein; a pair of arms positioned in each of the receptacles on the opposite sides of the slitting means; means connecting the similar arms in each of the rows of receptacles; means for actuating said connecting means during the movement of the drum whereby the said arms are moved to and from each other; means in each of the receptacles for slinging one end of the dough toward said arm; means in each of the receptacles for slinging the other end of the dough toward the opposite end of the receptacle; and means adapted to receive the dough from said receptacle.

34. In a cruller making machine,—a drum having rows of receptacles on the lateral surface thereof; means for feeding dough to the rows of receptacles; means for actuating the drum and the feeding means, each of the receptacles having means for slitting the dough therein, each of the receptacles having a transverse slot adjacent one end thereof; a pair of arms projecting through said slot into each of the receptacles, said arms being positioned on opposite sides of said slitting means; means connecting the arms positioned on the same side of the slitting means in the same rows of receptacles; means for actuating said connecting means whereby said arms are moved to and from each other; means in each of the receptacles for slinging one end of the dough toward said arms; means in each of the receptacles for slinging the other end of the dough toward the opposite end of the receptacle; and means adapted to receive the shaped dough from the receptacles.

35. In a cruller making machine,—a stationary shaft; a drum rotatably mounted on said shaft and having rows of receptacles on the lateral surface thereof; means for feeding dough to the rows of receptacles; means for rotating the drum and the feeding means, each of the receptacles having means for slitting the dough therein, each of the receptacles having a transverse slot adjacent one end thereof; a pair of arms projecting through said slot into each of the receptacles and positioned on the opposite side of said slitting means; means connecting the arms positioned on the same side of said slitting means in the receptacles of the same row; means secured on the shaft and adapted to engage said connecting means whereby said arms are moved to and from each other; means in each of the receptacles for slinging one end of the dough in the same toward said arms; means in each of the receptacles for slinging the other end of the dough toward the opposite end of the receptacle; and means adapted to receive the shaped dough from the receptacles.

36. In a cruller making machine,—a drum having rows of receptacles on the lateral surface thereof; means for feeding dough to the rows of receptacles; means for actuating the drum and the feeding means; means in each of the receptacles for slitting the dough therein; means in each of the receptacles for spreading the slit in the dough; a member associated with each of the receptacles; means for moving the member into and out of the receptacle whereby one end of the dough in each of the receptacles is moved into the spread slit of the dough; means in each of the receptacles for slinging the other end of the dough toward the opposite end of the receptacles; and means adapted to receive the shaped dough from the receptacles.

37. In a cruller making machine,—a drum having rows of receptacles on the lateral surface thereof; means for feeding dough to the rows of receptacles; means for actuating the drum and the feeding means; means in each of the receptacles for slitting the dough therein; means in each of the receptacles for spreading the slit, each of said receptacles having a slot adjacent one end; a member within the slot in each of the receptacles; means for moving said member toward the spreading means whereby one end of the dough is slung into the spread slit of the same; means in each of the receptacles for slinging the other end of the dough toward the opposite end of the receptacle; and means adapted to receive the shaped dough from the receptacles.

38. In a cruller making machine,—a drum having rows of receptacles on the lateral surface thereof; means for feeding dough to the rows of receptacles; means for actuating the drum and the feeding means; means in each of the receptacles for slitting the dough therein; means for spreading the slit dough in each of the receptacles, each of the receptacles having a longitudinal slot adjacent one end thereof; a member within the slot in each of the receptacles; means connecting said members located in the same row of receptacles; means for actuating said connecting means whereby said member is moved into the receptacle toward said spreading means and thereby slinging one end of the dough in each of the receptacles into the spread slit; means in each of the receptacles for slinging the other end of the dough toward the opposite end of the receptacle; and means for receiving the shaped dough from the receptacles.

39. In a cruller making machine,—a drum having rows of receptacles on the lateral surface thereof; means for feeding dough to the rows of receptacles; means for actuating the drum and the feeding means; means in each of the receptacles for slitting the dough therein; means in each of the receptacles for spreading the slit of the dough; means in each of the receptacles for slinging one end of the dough into the spread end; a member at the other end of each of the receptacles; means for revolving said member whereby the dough contacting with same is slung toward the opposite end of the receptacle; and means for receiving the shaped dough from the receptacle.

40. In a cruller making machine,—a drum having rows of receptacles on the lateral surface thereof; means for feeding dough to the rows of receptacles; means for actuating the drum and the feeding means; means in each of the receptacles for slitting the dough therein; means in each of the receptacles for spreading the slit in the dough; means in each of the receptacles for slinging one end of the dough into the spread slit; a pallet at the opposite end in each of the receptacles; means connecting the pallets of the same row of receptacles together; means for actuating said connecting means whereby said pallet is moved so as to sling the dough resting on the same toward the opposite end of the receptacle; and means for receiving the shaped dough from the receptacles.

41. In a cruller making machine,—a receptacle; means for feeding dough to the receptacle; means for actuating the receptacle and the feeding means, said receptacle having a longitudinal slit, a transverse slot and a longitudinal slot; a blade within said slit; a pair of arms within said transverse slot, one on each side of said blade; a member within the longitudinal slot and in alinement with said blade; a pallet in said receptacle, also in alinement with said blade; independent means engaging said blade, arms, member and pallet whereby the same are operated when the receptacle is moved, thereby shaping the dough in the receptacle into a predetermined form; and means adapted to receive the shaped dough from the receptacle.

42. In a cruller making machine,—a drum having rows of receptacles on the lateral surface thereof; means for feeding dough to the rows of receptacles; means for actuating the drum and the feeding means; means in each of the receptacles for cutting and slinging the dough into a predetermined form during the movement of the drum; and a conveyer for receiving the shaped dough from the receptacles.

In testimony whereof I have signed my name to this specification in the presence of two subscribing witnesses.

IGNATZIUS HEINZ.

Witnesses:
BENEDICT JAFFE,
PHILIP D. ROLLHAUS.

---

Copies of this patent may be obtained for five cents each, by addressing the "Commissioner of Patents, Washington, D. C."